US012621842B2

(12) United States Patent　　　　(10) Patent No.:　US 12,621,842 B2
Si et al.　　　　　　　　　　　　　　(45) Date of Patent:　　　May 5, 2026

(54) DYNAMIC ADAPTATION OF TIME DOMAIN RESOURCE FOR PERIODIC OR SEMI-PERSISTENT DOWNLINK SIGNALS

(71) Applicant: Samsung Electronics Co., Ltd., Suwon-si (KR)

(72) Inventors: Hongbo Si, Plano, TX (US); Qiongjie Lin, Sunnyvale, CA (US)

(73) Assignee: Samsung Electronics Co., Ltd., Suwon-si (KR)

( * ) Notice:　Subject to any disclaimer, the term of this patent is extended or adjusted under 35 U.S.C. 154(b) by 418 days.

(21) Appl. No.: 18/185,354

(22) Filed:　　Mar. 16, 2023

(65)　　　　　Prior Publication Data

US 2023/0328756 A1　　Oct. 12, 2023

Related U.S. Application Data

(60) Provisional application No. 63/326,560, filed on Apr. 1, 2022, provisional application No. 63/326,004, filed on Mar. 31, 2022.

(51) Int. Cl.
　　*H04W 72/232*　　(2023.01)
　　*H04L 5/00*　　　(2006.01)
(52) U.S. Cl.
　　CPC ......... *H04W 72/232* (2023.01); *H04L 5/0048* (2013.01); *H04L 5/0094* (2013.01); *H04L 5/0096* (2013.01)
(58) Field of Classification Search
　　CPC ......... H04W 72/11; H04W 72/23–232; H04W 72/535; H04L 5/0048; H04L 5/005;
　　　　　　　　(Continued)

(56)　　　　　References Cited

U.S. PATENT DOCUMENTS

2020/0100179 A1*　3/2020　Zhou ................. H04W 52/0209
2020/0229098 A1*　7/2020　Cheng ............... H04W 52/0248
　　　　　　　　　　　(Continued)

FOREIGN PATENT DOCUMENTS

EP　　　3952478 A1　　2/2022
EP　　　3955502 A1　　2/2022

OTHER PUBLICATIONS

International Search Report and Written Opinion issued Jun. 30, 2023 regarding International Application No. PCT/KR2023/004391, 7 pages.

(Continued)

*Primary Examiner* — Pao Sinkantarakorn

(57)　　　　　ABSTRACT

Apparatuses and methods for dynamic adaptation of a time domain resource for periodic or semi-persistent downlink signal are provided. A method of operating a user equipment (UE) includes receiving a set of configurations from a higher layer, identifying a first set of configurations from the set of configurations indicating resources for reception of downlink signals, and identifying a second set of configurations from the set of configurations for a physical downlink control channel (PDCCH) including a downlink control information (DCI) format. The DCI format includes adaptation information. The method further includes receiving the downlink signals based on the first set of configurations, receiving the PDCCH including the DCI format based on the second set of configurations, identifying, based on the adaptation information, a third set of configurations indicating the resources for reception of the downlink signals, and receiving the downlink signals based on the third set of configurations.

18 Claims, 9 Drawing Sheets

700

A UE receives a first configuration for a broadcast/multicast physical layer signal/channel which carries an adaptation indication on configuration for reception of paging PDCCH.　701

The UE receives the physical layer signal/channel in a reception occasion according to the first configuration.　702

The UE determines a second configuration for reception of paging PDCCH based on the adaptation indication provided in the received physical layer signal/channel.　703

The UE monitors PDCCH for DCI format with CRC scrambled by P-RNTI according to the second configuration.　704

(58) Field of Classification Search
CPC ... H04L 5/0051; H04L 5/0091; H04L 5/0092;
H04L 5/0093; H04L 5/0096
See application file for complete search history.

(56) References Cited

U.S. PATENT DOCUMENTS

| | | | |
|---|---|---|---|
| 2021/0288773 | A1 | 9/2021 | Lin et al. |
| 2022/0060298 | A1 | 2/2022 | Taherzadeh Boroujeni et al. |
| 2022/0070823 | A1 | 3/2022 | Ma et al. |
| 2022/0095268 | A1 | 3/2022 | Oh et al. |
| 2023/0199659 | A1* | 6/2023 | Zhou ..................... H04L 5/0078 |
| | | | 370/318 |
| 2024/0014973 | A1* | 1/2024 | Xu ........................ H04W 68/02 |
| 2025/0063558 | A1* | 2/2025 | Li ..................... H04W 72/0457 |

OTHER PUBLICATIONS

Samsung, "Corrections on UE power savings enhancements in NR", 3GPP TSG RAN WG1 Meeting #108-e, R1-2202953, Mar. 2022, 10 pages.

"3rd Generation Partnership Project; Technical Specification Group Radio Access Network; NR; Physical channels and modulation (Release 17)", 3GPP TS 38.211 V17.0.0, Dec. 2021, 134 pages.
"3rd Generation Partnership Project; Technical Specification Group Radio Access Network; NR; Multiplexing and channel coding (Release 17)", 3GPP TS 38.212 V17.0.0, Dec. 2021, 190 pages.
"3rd Generation Partnership Project; Technical Specification Group Radio Access Network; NR; Physical layer procedures for control (Release 17)", 3GPP TS 38.213 V17.0.0, Dec. 2021, 225 pages.
"3rd Generation Partnership Project; Technical Specification Group Radio Access Network; NR; Physical layer for procedures for data (Release 17)", 3GPP TS 38.214 V17.0.0, Dec. 2021, 217 pages.
"5G; NR; Radio Resource Control (RRC); Protocol specification (3GPP TS 38.331 version 16.7.0 Release 16)", ETSI TS 138 331 V16.7.0, Jan. 2022, 950 pages.
"5G; NR; Medium Access Control (MAC) protocol specification (3GPP TS 38.321 version 16.7.0 Release 16)", ETSI TS 138 321 V16.7.0, Jan. 2022, 160 pages.
Extended European Search Report issued Jun. 30, 2025 regarding Application No. 23781440.5, 11 pages.

* cited by examiner

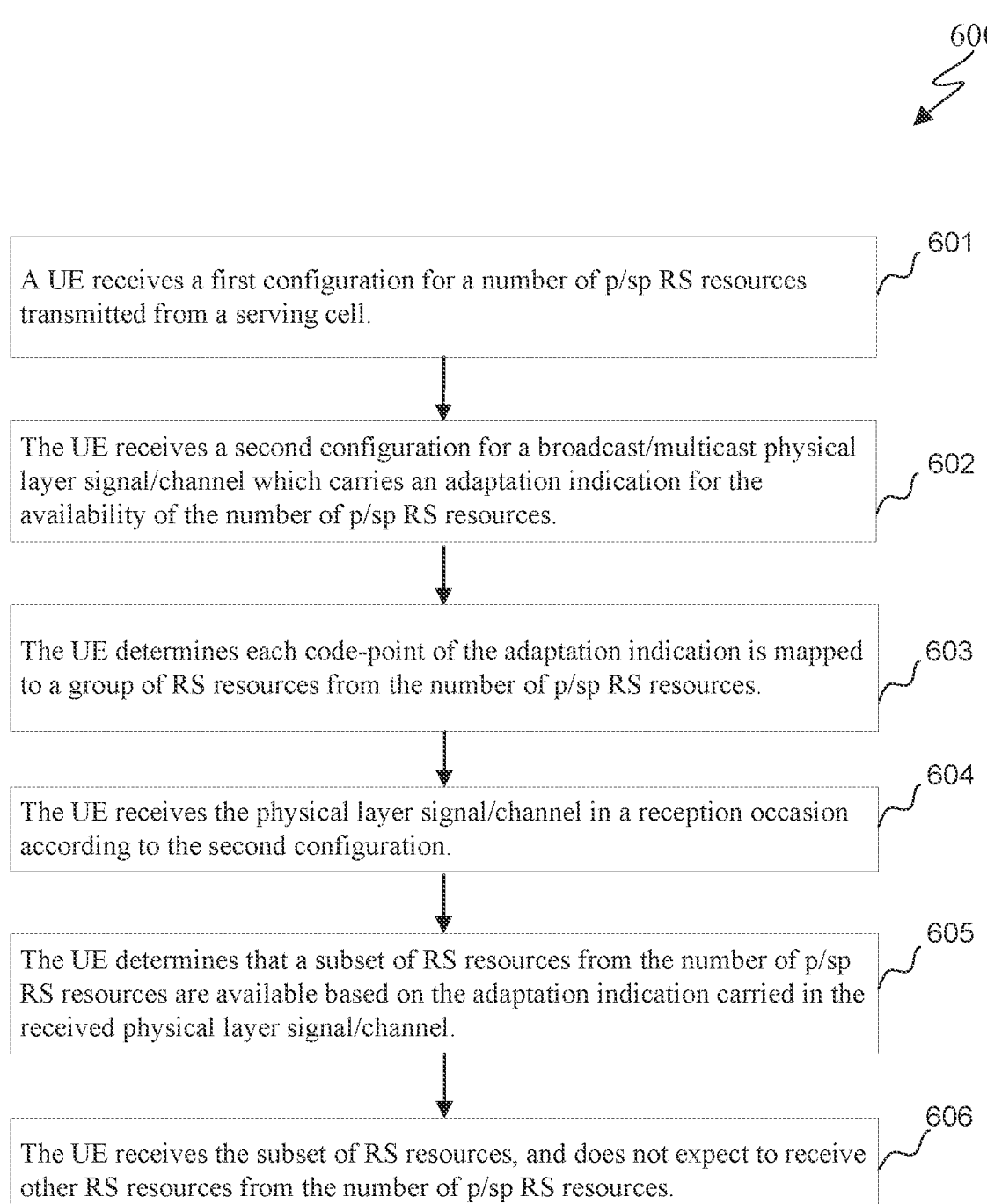

*600*

*601*

A UE receives a first configuration for a number of p/sp RS resources transmitted from a serving cell.

*602*

The UE receives a second configuration for a broadcast/multicast physical layer signal/channel which carries an adaptation indication for the availability of the number of p/sp RS resources.

*603*

The UE determines each code-point of the adaptation indication is mapped to a group of RS resources from the number of p/sp RS resources.

*604*

The UE receives the physical layer signal/channel in a reception occasion according to the second configuration.

*605*

The UE determines that a subset of RS resources from the number of p/sp RS resources are available based on the adaptation indication carried in the received physical layer signal/channel.

*606*

The UE receives the subset of RS resources, and does not expect to receive other RS resources from the number of p/sp RS resources.

FIG. 6

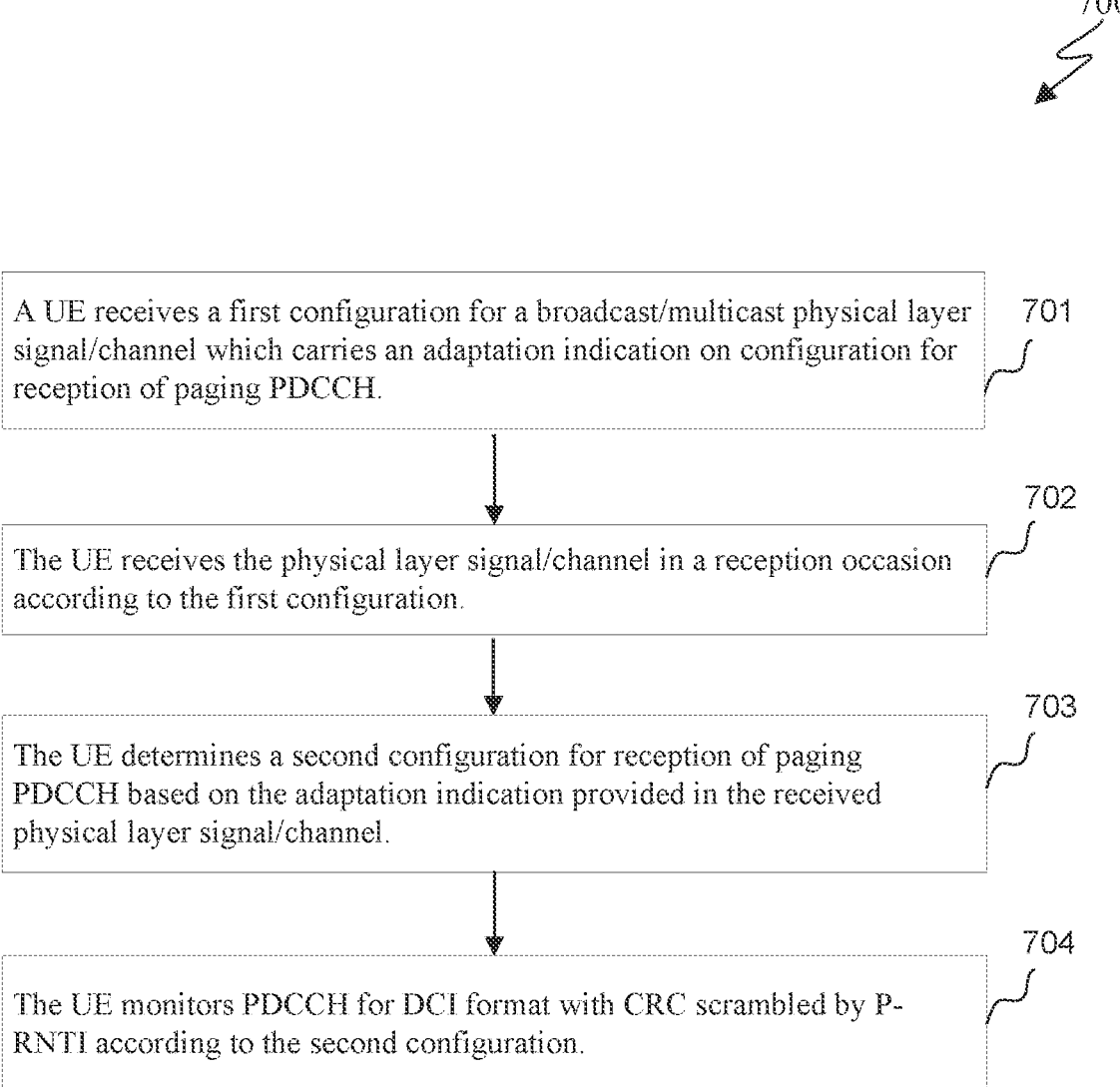

700

A UE receives a first configuration for a broadcast/multicast physical layer signal/channel which carries an adaptation indication on configuration for reception of paging PDCCH.    701

The UE receives the physical layer signal/channel in a reception occasion according to the first configuration.    702

The UE determines a second configuration for reception of paging PDCCH based on the adaptation indication provided in the received physical layer signal/channel.    703

The UE monitors PDCCH for DCI format with CRC scrambled by P-RNTI according to the second configuration.    704

FIG. 7

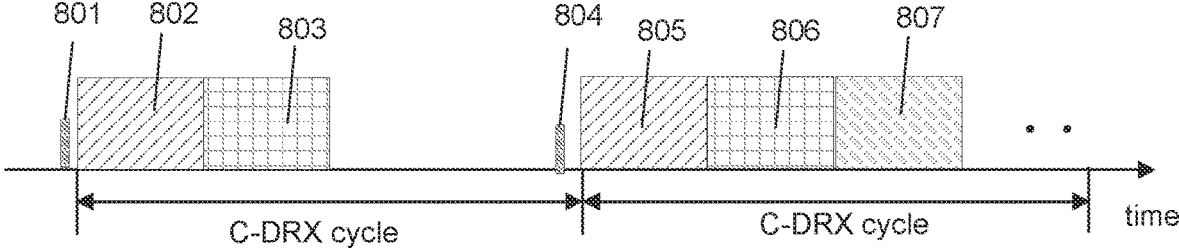
FIG. 8

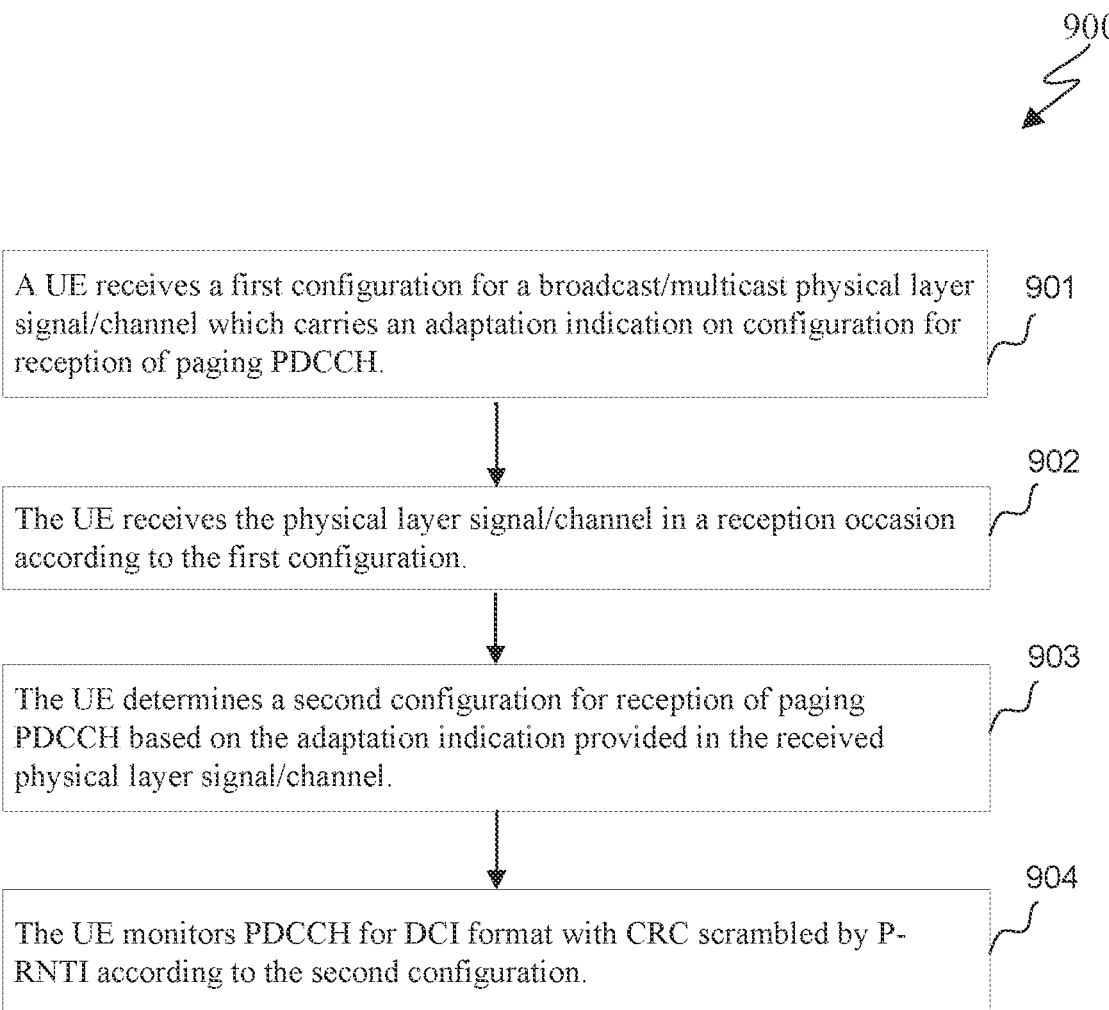

*900*

A UE receives a first configuration for a broadcast/multicast physical layer signal/channel which carries an adaptation indication on configuration for reception of paging PDCCH.    901

The UE receives the physical layer signal/channel in a reception occasion according to the first configuration.    902

The UE determines a second configuration for reception of paging PDCCH based on the adaptation indication provided in the received physical layer signal/channel.    903

The UE monitors PDCCH for DCI format with CRC scrambled by P-RNTI according to the second configuration.    904

FIG. 9

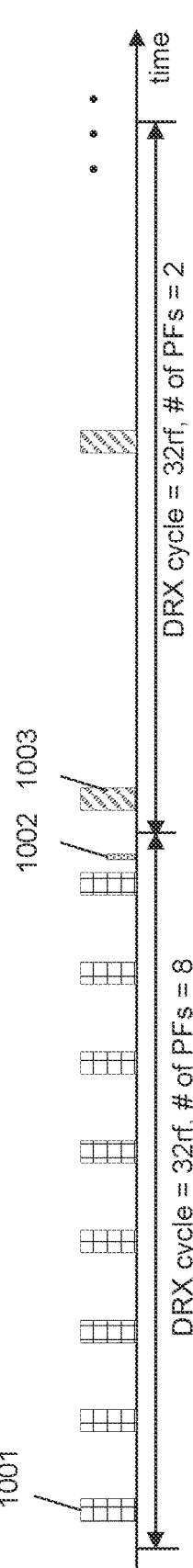
FIG. 10

DYNAMIC ADAPTATION OF TIME DOMAIN RESOURCE FOR PERIODIC OR SEMI-PERSISTENT DOWNLINK SIGNALS

CROSS-REFERENCE TO RELATED APPLICATION AND CLAIM OF PRIORITY

This application claims priority under 35 U.S.C. § 119 (e) to U.S. Provisional Patent Application No. 63/326,004 filed on Mar. 31, 2022, and U.S. Provisional Patent Application No. 63/326,560 filed on Apr. 1, 2022. The above-identified provisional patent applications are hereby incorporated by reference in their entirety.

TECHNICAL FIELD

The present disclosure relates generally to wireless communication systems and, more specifically, to dynamic adaptation of a time domain resource for periodic or semi-persistent downlink signals.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to apparatuses and methods for dynamic adaptation of a time domain resource for periodic or semi-persistent downlink signals.

In one embodiment, a base station (BS) in a wireless communication system is provided. The BS includes a processor configured to identify a first set of configurations indicating resources for transmission of downlink signals and identify a second set of configurations for a physical downlink control channel (PDCCH) including a downlink control information (DCI) format. The DCI format includes adaptation information. The BS also includes a transceiver operably coupled to the processor. The transceiver is configured to transmit a set of configurations by a higher layer. The set of configurations include the first set of configurations and the second set of configurations. The transceiver is further configured to transmit the downlink signals based on the first set of configurations and transmit the PDCCH including the DCI format based on the second set of configurations. The processor is further configured to identify, based on the adaptation information, a third set of configurations indicating the resources for transmission of the downlink signals. The transceiver is further configured to transmit the downlink signals based on the third set of configurations.

In another embodiment, a user equipment (UE) in a wireless communication system is provided. The UE includes a transceiver configured to receive a set of configurations from a higher layer and a processor operably coupled to the transceiver. The processor is configured to identify a first set of configurations from the set of configurations indicating resources for reception of downlink signals and identify a second set of configurations from the set of configurations for a PDCCH including a DCI format. The DCI format includes adaptation information. The transceiver is further configured to receive the downlink signals based on the first set of configurations and receive the PDCCH including the DCI format based on the second set of configurations. The processor is further configured to, based on the adaptation information, identify a third set of configurations indicating the resources for reception of the downlink signals. The transceiver is further configured to receive the downlink signals based on the third set of configurations.

In yet another embodiment, a method of a UE in a wireless communication system is provided. The method includes receiving a set of configurations from a higher layer, identifying a first set of configurations from the set of configurations indicating resources for reception of downlink signals, and identifying a second set of configurations from the set of configurations for a PDCCH including a DCI format. The DCI format includes adaptation information. The method further includes receiving the downlink signals based on the first set of configurations, receiving the PDCCH including the DCI format based on the second set of configurations, identifying, based on the adaptation information, a third set of configurations indicating the resources for reception of the downlink signals, and receiving the downlink signals based on the third set of configurations.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example method performed by a UE for the dynamic adaptation on periodic/semi-persistent (p/sp) reference signal (RS) resources transmissions in the downlink (DL) according to embodiments of the present disclosure;

FIG. 7 illustrates an example method performed by a UE for the dynamic adaptation on connected mode discontinuous reception (C-DRX) according to embodiments of the present disclosure;

FIG. 8 illustrates an example timeline for the dynamic adaptation a C-DRX regarding the start of the ON duration according to embodiments of the present disclosure;

FIG. 9 illustrates an example method performed by a UE for the dynamic adaptation on the configuration for reception of a paging physical downlink control channel (PDCCH) according to embodiments of the present disclosure; and FIG. 10 illustrates an example timeline for the dynamic adaptation on the configuration for reception of a paging PDCCH according to embodiments of the present disclosure.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.0.0, "NR, Physical Channels and Modulation" (herein "REF 1"); 3GPP TS 38.212 v17.0.0, "NR, Multiplexing and channel coding" (herein "REF 2"); 3GPP TS 38.213 v17.0.0, "NR, Physical Layer Procedures for Control" (herein "REF 3"); 3GPP TS 38.214 v17.0.0; "NR, Physical Layer Procedures for Data" (herein "REF 4"); 3GPP TS 38.331 v16.7.0; "NR, Radio Resource Control (RRC) Protocol Specification" (herein "REF 5"); and 3GPP TS 38.321 v16.7.0; "NR, Medium Access Control (MAC) Protocol Specification" (herein "REF 6").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems, and to enable various vertical applications, 5G/NR communication systems have been developed and are currently being deployed.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
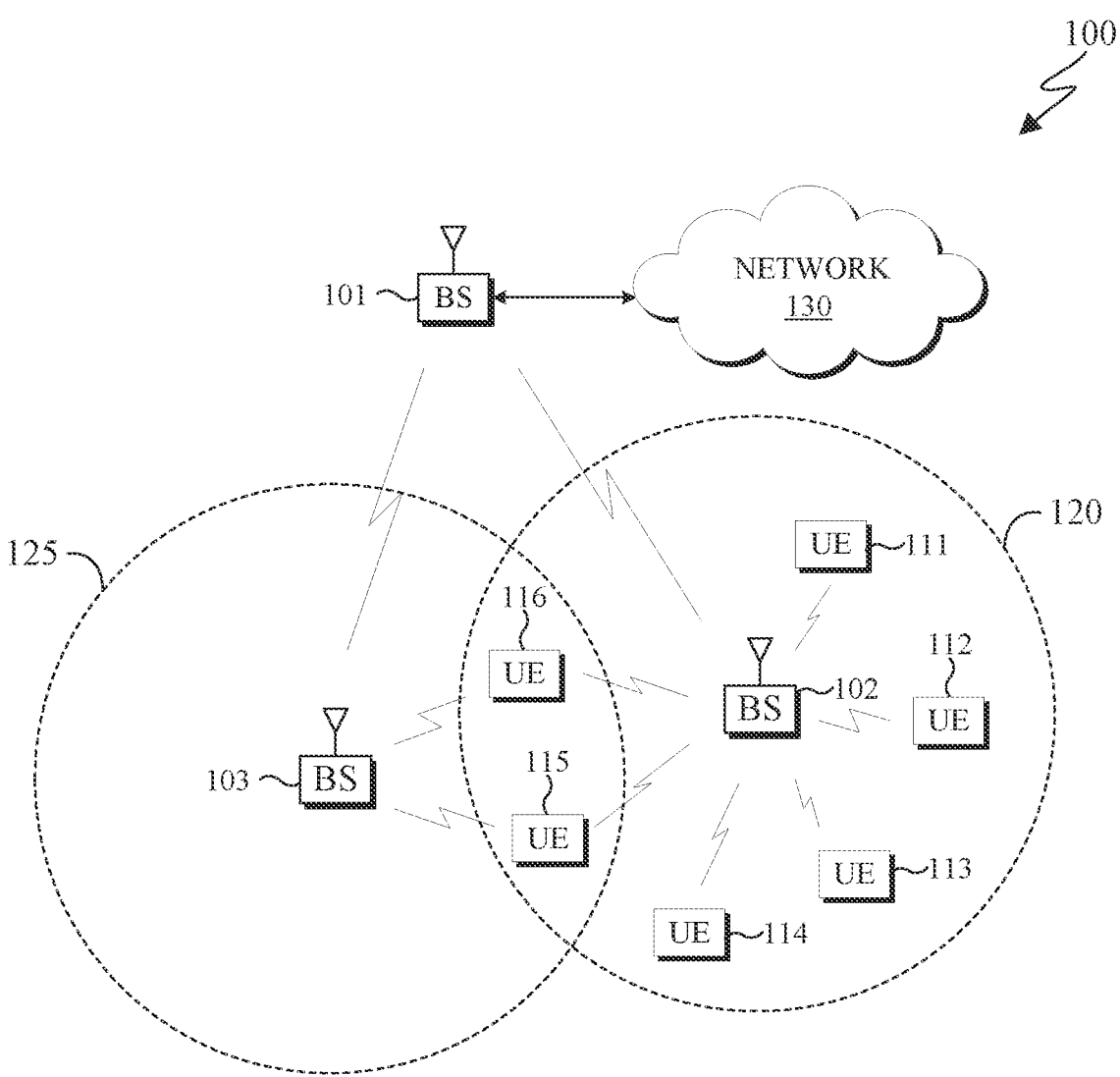
FIG. 1 illustrates an example wireless network according to embodiments of the present disclosure.
Figure 2:
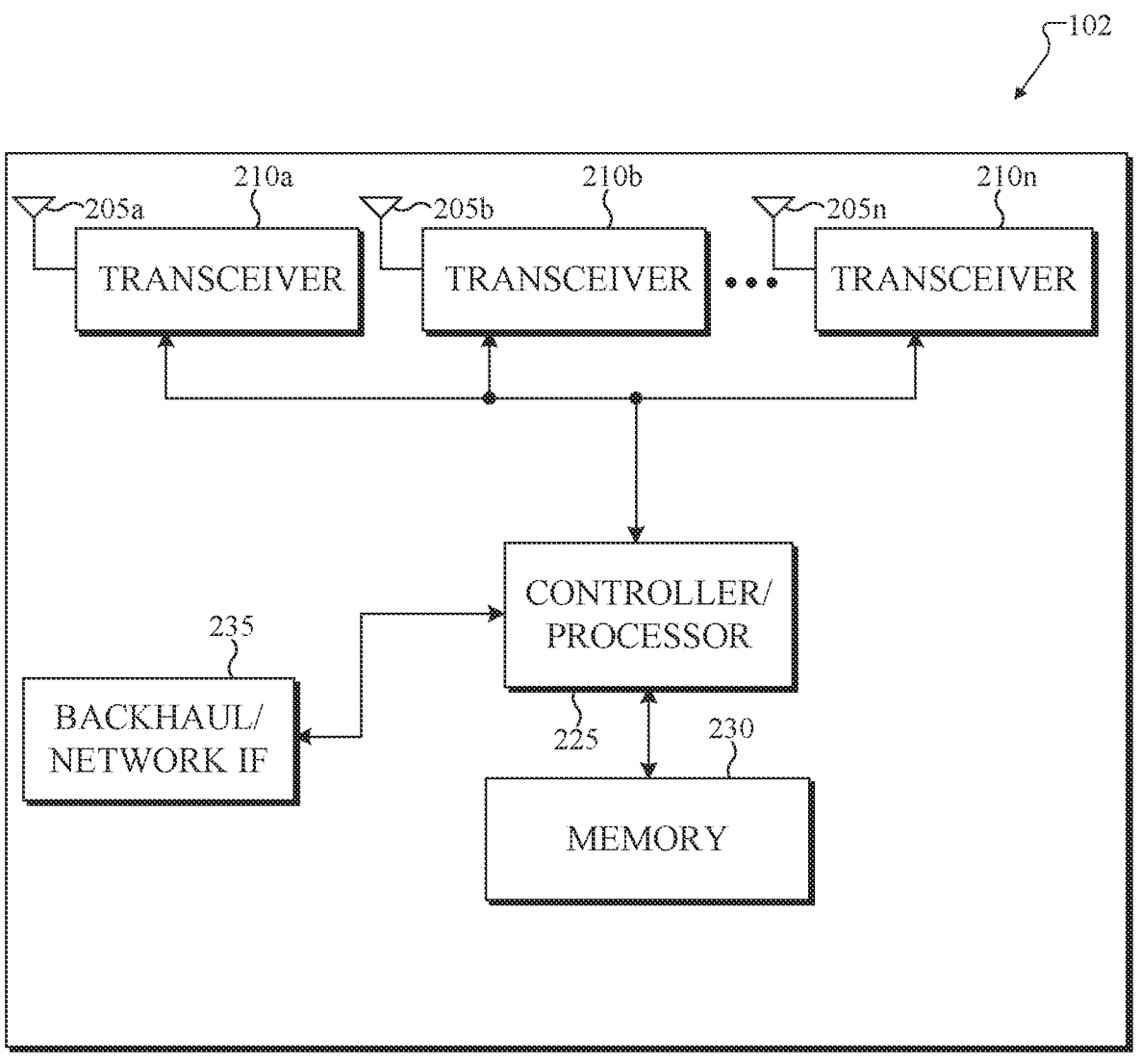
FIG. 2 illustrates an example gNodeB (gNB) according to embodiments of the present disclosure.
Figure 3:
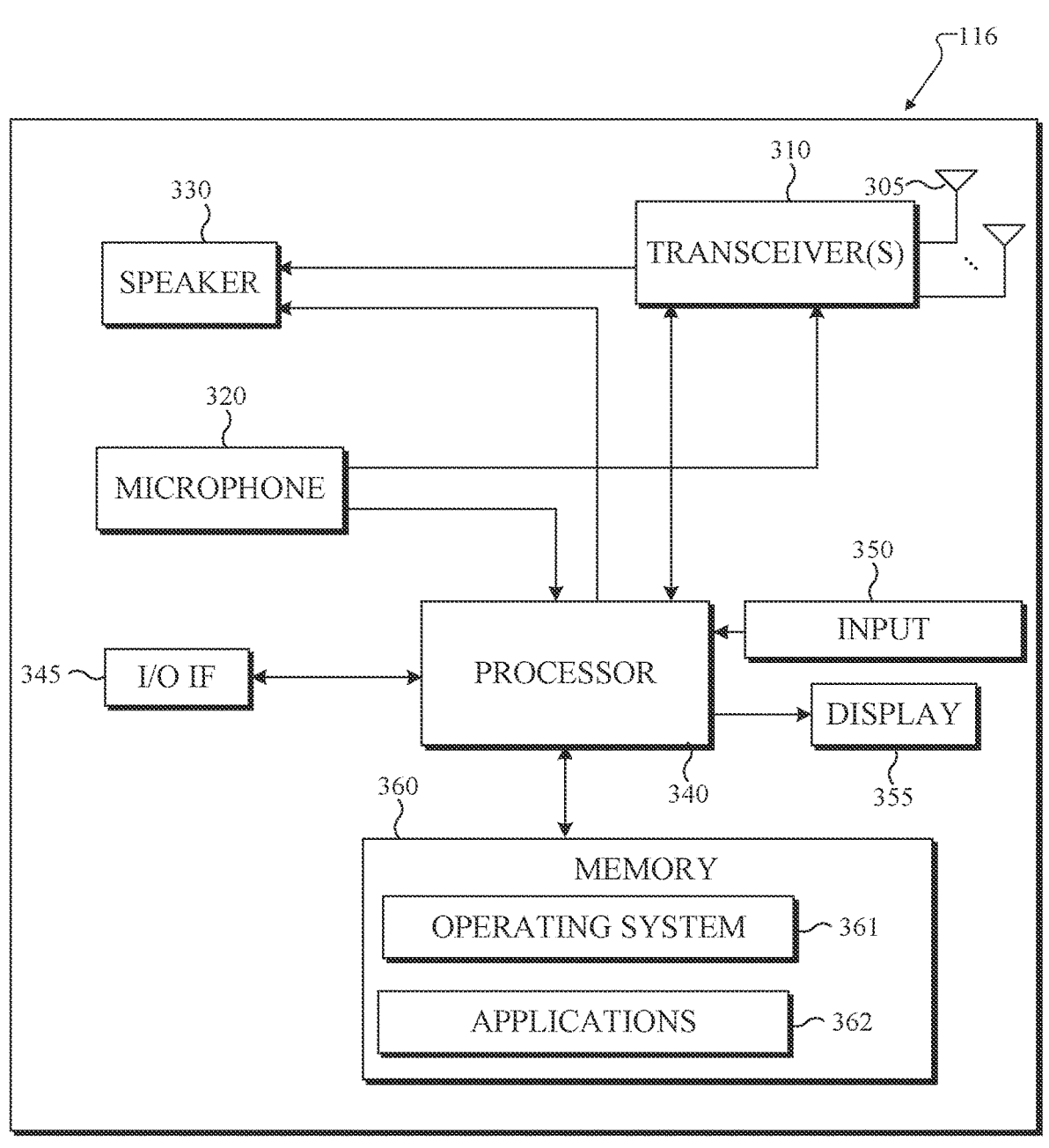
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103.

The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting dynamic adaptation of a time domain resource for periodic or semi-persistent downlink signal. In certain embodiments, one or more of the BSs 101-103 include circuitry, programing, or a combination thereof for supporting dynamic adaptation of a time domain resource for periodic or semi-persistent downlink signals.

Although FIG. 1 illustrates one example of a wireless network, various changes may be made to FIG. 1. For example, the wireless network could include any number of gNBs and any number of UEs in any suitable arrangement.

Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting dynamic adaptation of a time domain resource for periodic or semi-persistent downlink signal. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for supporting dynamic adaptation of a time domain resource for periodic or semi-persistent downlink signal. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
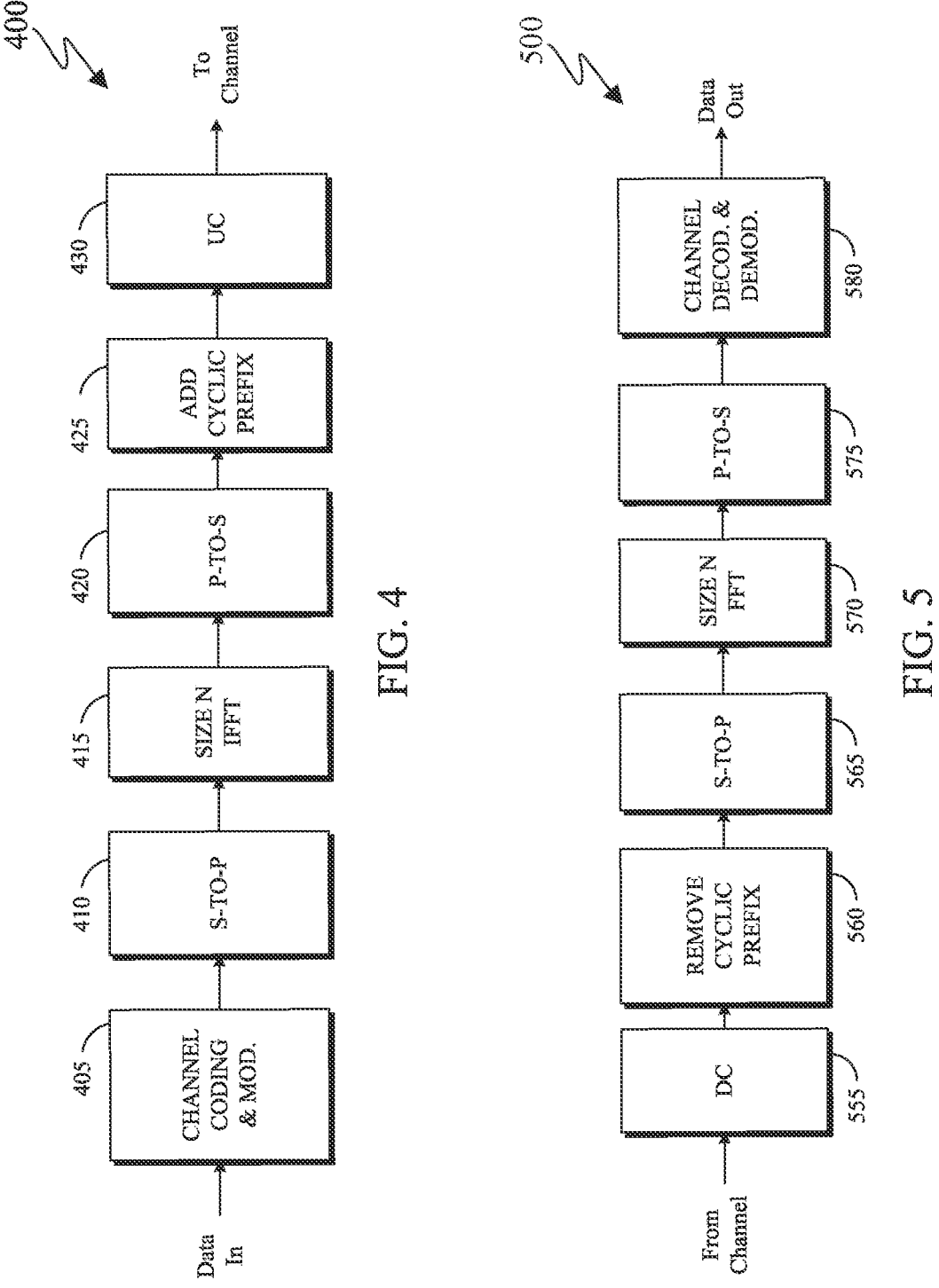
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support dynamic adaptation of a time domain resource for periodic or semi-persistent downlink signals as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG.

5 are meant to illustrate examples of the types of transmit and receive paths that can be used in a wireless network. Any other suitable architectures can be used to support wireless communications in a wireless network.

Various embodiments of the present disclosure recognize that with the increasing number of 5G base states deployed to support 5G wireless communications, the power consumption of 5G network has become a heavy burden to operators. The power consumption of a single NR based station is +3 times higher than LTE, due to higher frequency band, wider bandwidth and massive MIMO operation. In NR Rel-16/17, several UE power saving schemes have been introduced to reduce energy consumption for UEs. To maintain a sustainable 5G deployment, it is important to consider efficient energy saving mechanisms from the network (NW) perspective.

Various embodiments of the present disclosure recognize that an issue for NW energy savings is large energy consumption on the gNB to transmit periodic/semi-persistent (p/sp) reference signals (RSs), such as channel state information (CSI)-reference signal (RS) or synchronization signal blocks (SSBS) in the downlink (DL), where the UE can measure the CSI or radio resource management (RRM) based on the reception of the p/sp RS resources. It takes large energy consumption on the gNB to adapt availability of the p/sp RS transmission based on semi-static (de) activation of RS resources via higher layer signaling. Various embodiments of the present disclosure recognize that an issue for NW energy saving is large energy consumption when the configuration for C-DRX is bad. For example, when the active time or ON duration for connected UEs are not aligned. The active time of a gNB can be longer than the effective active time of served UEs. For another example, there is a tradeoff between the performance requirement from gNB and UE. gNB may prefer a long DRX cycle, or short ON duration for the benefit of NW energy savings, while UE may prefer a short DRX cycle or long ON duration for the benefit of short scheduling delay. In addition, it takes large energy consumption on gNB to adapt the configuration for C-DRX based on higher layer signaling, such as RRC signaling per UE.

In addition, various embodiments of the present disclosure recognize that another issue for NW energy savings is the tradeoff between NW energy savings and UE power savings regarding the configuration for paging. From a gNB perspective, the gNB prefers a small number of POs/PFs that results in a large group paging rate. However, a UE prefers a large number of POs/PFs to result in a small group paging rate for the benefit of UE power savings. It also takes large energy consumption on the gNB to adapt the configuration for paging based on SI update procedure via higher layer signaling.

Further, various embodiments of the present disclosure recognize that there is a need to determine dynamic adaptation on availability of periodic or semi-persistent (p/sp) RS resources transmissions in DL for NW energy savings. In addition, various embodiments of the present disclosure recognize that there is a need to determine the actually transmitted synchronization signal/physical broadcast channel (SS/PBCH) block based on the dynamic adaptation on the periodic or semi-persistent (p/sp) RS resources transmissions in the DL. Further, various embodiments of the present disclosure recognize that there is a need to determine dynamic adaptation on DRX for UEs in an RRC_CONNECTED state for NW energy savings. Further still, various embodiments of the present disclosure recognize that there is a need to determine dynamic adaptation on configuration for reception of paging PDCCH for NW energy savings.

Accordingly, various embodiments of the present disclosure provide mechanisms for determining dynamic adaptation on availability of periodic or semi-persistent (p/sp) RS resources transmissions in the DL for NW energy savings. Further, various embodiments of the present disclosure provide mechanisms for determining the actually transmitted SS/PBCH block based on the dynamic adaptation on the periodic or semi-persistent (p/sp) RS resources transmissions in the DL. In addition, various embodiments of the present disclosure provide mechanisms for determining dynamic adaptation on DRX for UEs in RRC_CONNECTED state for NW energy savings. Still further, various embodiments of the present disclosure provide mechanisms for determining dynamic adaptation on configuration for reception of paging PDCCH for NW energy savings.

In one embodiment, a mechanism for determining dynamic adaptation on availability of p/sp RS resources transmissions in DL is provided.

FIG. 6 illustrates an example method 600 performed by a UE for the dynamic adaptation on of p/sp RS resources transmissions in the DL according to embodiments of the present disclosure. The embodiment of the method 600 performed by a UE for the dynamic adaptation of p/sp RS resources transmissions in the DL illustrated in FIG. 6 is for illustration only. Other embodiments of the method 600 performed by a UE for the dynamic adaptation of p/sp RS resources transmissions in the DL could be used without departing from the scope of this disclosure.

As illustrated in FIG. 6, at block 601, a UE (such as the UE 116) receives a first configuration for a number of p/sp RS resources transmitted from a serving cell. At block 602, the UE also receives a second configuration for a broadcast/multicast physical layer signal/channel which carries an adaptation indication for the availability of the number of p/sp RS resources. At block 603, the UE determines each code-point of the adaptation indication is mapped to a group of RS resources from the number of p/sp RS resources. At block 604, the UE receives the physical layer signal/channel in a reception occasion according to the second configuration. At block 605, the UE determines that a subset of RS resources from the number of p/sp RS resources are available based on the adaptation indication carried in the received physical layer signal/channel. At block 606, the UE receives the subset of RS resources, and does not expect to receive other RS resources from the number of p/sp RS resources.

A UE can receive a first configuration for a number of periodic RS resources transmitted from a serving cell. The RS resources can be at least one of CSI-RS resources or SS/PBCH blocks (SSBs). The first configuration can be provided to the UE either by UE-specific RRC signaling or SIB. The first configuration can include at least a periodicity for each set of CSI-RS resources or a set of SSBs.

The UE can receive a second configuration for a physical layer signal/channel from a serving cell, wherein the physical layer signal/channel is configured with an adaptation indication to provide availability information for the number of periodic RS resources. The UE can assume at least one of the following approaches for the design of the physical layer signal/channel:

In one approach, the physical layer signal/channel is a PDCCH broadcast to all connected UEs in the serving cell. The UE is configured to monitor or receive the cell-specific PDCCH in common search space. The PDCCH carries a DCI format with CRC bits scrambled by a RNTI which is common to all connected UEs in the serving cell, wherein the adaptation indication is a field in the DCI format. The UE can receive the second configuration in a SIB. In one example, the RNTI can be dedicated to cell-specific adaptation for NW energy savings. In another example, the RNTI can be determined based on the cell ID. In yet another example, the RNTI can be provided to UE in a SIB. In one sub-example, the UE assumes the field in the DCI format consists of multiple blocks, wherein the UE is configured to receive the adaptation indication in at least one block of the multiple blocks. The UE can determine the block from the location of the one block in the payload of the DCI formation based on the second configuration.

In one approach, the physical layer signal/channel is a PDCCH multicast to a group of connected UEs in the serving cell. The UE is configured to monitor or receive the group common (GC) PDCCH in common search space. The PDCCH carries a DCI format with CRC bits scrambled by a RNTI which is common to the group of connected UEs in the serving cell, wherein the adaptation indication is a field in the DCI format. The UE can receive the second configuration in via RRC signaling. In one example, the RNTI can be dedicated to cell-specific adaptation for NW energy savings. In another example, the RNTI can be group RNTI (G-RNTI). In yet another example, the RNTI can be SFI-RNTI. In one sub-example, the UE assumes the field in the DCI format consists of multiple blocks, wherein the UE is configured to receive the adaptation indication in at least one block of the multiple blocks. The UE can determine the block from the location of the one block in the payload of the DCI formation based on the second configuration.

In one approach, the physical layer signal/channel is a DL signal that is constructed based on a sequence. The DL signal is broadcast to all connected UEs in the serving cell. The sequence in the DL signal carries the adaptation indication. The sequence in the DL signal can also carry the RNTI which is common to all connected UEs in the serving cell. In one example, the RNTI can be dedicated to cell-specific adaptation for NW energy savings. In another example, the RNTI can be determined based on the cell ID. In yet another example, the RNTI can be provided to UE in a SIB. The UE can receive the second configuration in a SIB.

In one approach, the physical layer signal/channel is a DL signal that is constructed based on a sequence. The DL signal is multicast to a group of connected UEs in the serving cell. The sequence in the DL signal carries the adaptation indication. The sequence in the DL signal can also carry the RNTI which is common to the group of connected UEs in the serving cell. In one example, the RNTI can be dedicated to cell-specific adaptation for NW energy savings. In another example, the RNTI can be group RNTI (G-RNTI). In yet another example, the RNTI can be SFI-RNTI. The UE can receive the second configuration via RRC signaling.

A value of the adaptation indication carried in the physical layer signal/channel is referred as a code-point. The adaptation indication can indicate a code-point from a set of code-points, wherein a code-code can indicate any of the following availability information for the number of p/sp RS resources:

In one approach, a code-point indicates a group of RS resources from the number of p/sp RS resources. The number of code-points can equal to the number of groups of RS resources from the number of p/sp RS resources. A code-point indicates a group index for a group of RS resources that are available. The UE can be provided with a group index for each set or group of RS resources from the p/sp RS resources. For example, the group index can be provided in the first configuration. When the RS resources are p/sp CSI-RS resources, a group index can be provided for a set of p/sp CSI-RS resources.

In one approach, the adaptation indication can be a bitmap, wherein each bit from the bitmap is associated with a group of RS resources from the number of p/sp RS resources. A binary value for each bit indicates whether or not the associated group of RS resources are available. The UE can determine the i-th bit is associated with i-th group of RS resources with group index of (i−1), wherein the value of group index starts from 0. The UE can be provided with a group index for each set or group of RS resources from the p/sp RS resources. For example, the group index can be provided in the first configuration. For a sub-example, the first configuration for a set of SSBs also provides information to indicate one or more SSBs from the set of SSBs are grouped together. The information can be multiple lists of SSB indexes, wherein each list of SSB indexes indicates a group of SSBs with the SSB indexes. Each list of SSB indexes can includes an group index, i=0, . . . , N−1 to indicate the group of SSBs is associated with the (i+t)th bit from the bitmap with size of N bits. For another sub-example, the first configuration for multiple sets of SSBs also provides information to indicate one or more sets of SSBs from the multiple sets of SSBs are grouped together. The configuration for a set of SSBs from the multiple sets of SSBs can include a group index for the set of SSBs. Alternatively, a group index can be provided to a list of SSB set indexes, wherein the list of multiple sets of SSBs with the SSB set indexes are grouped together. For another example, a group index can be predetermined. For one sub-example when the p/sp RS resources are SSBs, a bit of the bitmap can be associated with a SSB from a set of SSBs. The size of the bitmap can equal to the size of maximum number of SSBs per set of SSBs. For example, the size of the bitmap can equal to the size of ssb-PositionsInBurst.

In one approach, a code-point indicates a time duration, e.g. in terms of a number of slots, wherein the UE expects a portion or all of the number of p/sp RS resources are available for the number of slots. The portion of the number of p/sp RS resources can be activated RS resources from the number of p/sp RS resources.

In one approach, a code-point indicates a time duration, e.g. in terms of a number of slots, wherein the UE expects a portion or all of the number of p/sp RS resources are not available for the number of slots. The portion of the number of p/sp RS resources can be activated RS resources from the number of p/sp RS resources.

When the UE receives the physical/channel signal/channel with the adaptation indication, the UE applies the adaptation indication at beginning of a first slot that is at least D slots/symbols after the last slot/symbol of the physical layer signal/channel that carries the adaptation indication. The UE can determine the application delay in terms of D slots/symbols based on at least one of the following approaches:

In one approach, D is predetermined in the specification of system operation as a UE capability. One or more UE capabilities can be defined in the specification of system operation.

In one approach, D is provided to UE by higher layers. For example, D is provided via a RRC configuration parameter.

In one approach, D is determined based on a UE capability report, where the UE transmits the report to gNB in advance.

After the UE applies the adaptation indication on the availability information for the number of p/sp RS resources, the UE receives a subset of RS resources from the number of p/sp RS resources that are indicated available based on the adaptation indication. The UE can assume the validity period or effective period of the availability information based on one of the following approaches:

In one approach, the UE assumes the availability information is valid till the UE receives another adaptation indication.

In one approach, the UE assumes the availability information is valid for a time duration. The unit of the time duration can be a slot or a millisecond or a periodicity of the indicated available RS resources. In one example, the time duration can be provided to the UE by higher layers, e.g. via RRC signaling or in SIB. In another example, the time duration can be predetermined in the specification of the system operation. In yet another example, the time duration can be provided in the physical layer signal/channel carries the availability information.

In one approach, for operation with shared spectrum channel access, if the UE is provided with channel occupancy information (e.g. by a GC-PDCCH), the UE can assume the availability information is valid until the end of the channel occupancy.

In one embodiment, a mechanism for determining the actually transmitted SS/PBCH block based on the dynamic adaptation of the p/sp RS resources transmissions in DL is provided.

When the targeted p/sp RS resources are SS/PBCH blocks, the UE can further determine a number of actually transmitted SS/PBCH blocks based on the first configuration and/or the adaptation indication in the physical layer signal/channel. For example, the first configuration may include an indication from higher layer on the transmission pattern of the SS/PBCH blocks on a serving cell, wherein the indication could be ssb-PositionsInBurst.

In one example, for operation without shared spectrum channel access, the UE determines a SS/PBCH block with SS/PBCH block index i is transmitted, if both the indication from higher layer (e.g. ssb-PositionsInBurst) and the adaptation indication in the physical layer signal/channel provides information that the corresponding SS/PBCH block is transmitted; otherwise, the UE determines the SS/PBCH block with SS/PBCH block index i is not transmitted.

In another example, for operation with shared spectrum channel access, the UE determines a SS/PBCH block with candidate SS/PBCH block index i may be transmitted, if both the indication from higher layer (e.g. ssb-PositionsInBurst) and the adaptation indication in the physical layer signal/channel provides information that the corresponding SS/PBCH block index is set as 1; otherwise, the UE determines the SS/PBCH block with candidate SS/PBCH block index i is not transmitted.

In one example, the UE determines resources for PDSCH according to the determined actually transmitted SS/PBCH block, according to the first configuration and/or the adaptation indication in the physical layer signal/channel as in examples described in this disclosure, if the adaptation indication in the physical layer signal/channel is provided and within the validation period of the indication.

In another example, the UE determines not required to monitor a PDCCH candidate, if it overlaps with at least one RE of a SS/PBCH block that is determined to be an actually transmitted SS/PBCH block, according to the first configuration and/or the adaptation indication in the physical layer signal/channel as in examples described in this disclosure, if the adaptation indication in the physical layer signal/channel is provided and within the validation period of the indication.

In yet another example, for the symbols in the determined actually transmitted SS/PBCH blocks, according to the first configuration and/or the adaptation indication in the physical layer signal/channel as in examples described in this disclosure, the UE doesn't expect to detect a DCI format 2_0 with an SFI-index field value indicating the set of symbols of the slot as uplink, if the adaptation indication in the physical layer signal/channel is provided and within the validation period of the indication.

In yet another example, the UE determines resources for PUCCH transmission (e.g. repeated PUCCH transmission) based on the determined actually transmitted SS/PBCH blocks, according to the first configuration and/or the adaptation indication in the physical layer signal/channel as in examples described in this disclosure, if the adaptation indication in the physical layer signal/channel is provided and within the validation period of the indication.

In yet another example, the UE does not transmit PUSCH, PUCCH, RACH in the slot if the transmission would overlap with any symbol of the determined actually transmitted SS/PBCH blocks, according to the first configuration and/or the adaptation indication in the physical layer signal/channel as in examples described in this disclosure, if the adaptation indication in the physical layer signal/channel is provided and within the validation period of the indication.

In yet another example, the UE determines valid RACH occasion based on the determined actually transmitted SS/PBCH blocks, according to the first configuration and/or the adaptation indication in the physical layer signal/channel as in examples described in this disclosure, if the adaptation indication in the physical layer signal/channel is provided and within the validation period of the indication.

In yet another example, the UE determines PDCCH monitoring occasions for paging based on the determined actually transmitted SS/PBCH blocks, according to the first configuration and/or the adaptation indication in the physical layer signal/channel as in examples described in this disclosure, if the adaptation indication in the physical layer signal/channel is provided and within the validation period of the indication.

In yet another example, the UE determines PDCCH monitoring occasions for SI message in the SI-window based on the determined actually transmitted SS/PBCH blocks, according to the first configuration and/or the adaptation indication in the physical layer signal/channel as in examples described in this disclosure, if the adaptation indication in the physical layer signal/channel is provided and within the validation period of the indication.

In one embodiment, dynamic adaptation DRX for UEs in the RRC_CONNECTED state (C-DRX) is considered. A C-DRX cycle can be associated with a long DRX cycle or a short DRX cycle.

FIG. 7 illustrates an example method 700 performed by a UE for the dynamic adaptation on C-DRX according to embodiments of the present disclosure. The embodiment of the example method 700 for the dynamic adaptation on C-DRX shown in FIG. 7 is for illustration only. Other embodiments of the example method 700 for the dynamic adaptation on C-DRX could be used without departing from the scope of this disclosure.

As illustrated in FIG. 7, at block 701, a UE receives a first configuration for a broadcast/multicast physical layer signal/channel which carries an adaptation indication on C-DRX. At block 702, the UE receives the physical layer signal/channel in a reception occasion according to the first configuration. At block 703, the UE determines a second configuration for C-DRX based on the adaptation indication carried in the received physical layer signal/channel. At block 704, the UE receives data or transmits data within active time of C-DRX according to the second configuration, 704.

The UE can receive a first configuration for a physical layer signal/channel from a serving cell, wherein the physical layer signal/channel is configured with an adaptation indication on C-DRX. The UE can assume any of the following approaches for the design of the physical layer signal/channel:

In one approach, the physical layer signal/channel is a PDCCH broadcast to all connected UEs in the serving cell. The UE is configured to monitor or receive the cell-specific PDCCH in common search space. The PDCCH carries a DCI format with CRC bits scrambled by a RNTI which is common to all connected UEs in the serving cell, wherein the adaptation indication is a field in the DCI format. The UE can receive the first configuration in a SIB. In one example, the RNTI can be dedicated to cell-specific adaptation for NW energy savings. In another example, the RNTI can be provided to UE in a SIB. In yet another example, the RNTI can be determined based on cell ID. In one sub-example, the UE assumes the field in the DCI format consists of multiple blocks, wherein the UE is configured to receive the adaptation indication in one block of the multiple blocks. The UE can determine the block from the location of the one block in the payload of the DCI formation based on the first configuration.

In one approach, the physical layer signal/channel is a PDCCH multicast to a group of connected UEs in the serving cell. The UE is configured to monitor or receive the group common (GC) PDCCH in common search space. The PDCCH carries a DCI format with CRC bits scrambled by a RNTI which is common to the group of connected UEs in the serving cell, wherein the adaptation indication is a field in the DCI format. The UE can receive the second configuration in via RRC signaling. In one example, the RNTI can be dedicated to cell-specific adaptation for NW energy savings. In another example, the RNTI can be group RNTI (G-RNTI). In yet another example, the RNTI can be SFI-RNTI. In one sub-example, the UE assumes the field in the DCI format consists of multiple blocks, wherein the UE is configured to receive the adaptation indication in one block of the multiple blocks. The UE can determine the block from the location of the one block in the payload of the DCI formation based on the first configuration.

In one approach, the physical layer signal/channel is a DL signal that is constructed based on a sequence. The DL signal is broadcast to all connected UEs in the serving cell. In one example, the sequence in the DL signal carries the adaptation indication. In another example, the sequence in the DL signal carries the RNTI, which is common to the group of connected UEs in the serving cell. In one sub-example, the RNTI can be dedicated to cell-specific adaptation for NW energy savings. In another sub-example, the RNTI can be provided to UE in a SIB. In yet another sub-example, the RNTI can be determined based on cell ID. The UE can receive the first configuration in a SIB.

In one approach, the physical layer signal/channel is a DL signal that is constructed based on a sequence. The DL signal is multicast to a group of connected UEs in the serving cell. In one example, the sequence in the DL signal carries the adaptation indication. In another example, the sequence in the DL signal carries the RNTI, which is common to all connected UEs in the serving cell. In one sub-example, the RNTI can be dedicated to cell-specific adaptation for NW energy savings. In another sub-example, the RNTI can be group RNTI (G-RNTI). In yet another sub-example, the RNTI can be SFI-RNTI. The UE can receive the first configuration via RRC signaling.

The UE can determine a monitoring periodicity, $T_s$, for the physical layer signal/channel with an adaptation indication on C-DRX, based on one of the following approaches:

In a first approach, $T_s$ is one or multiple monitoring periodicity for paging PDCCH reception, such that $T_s = k \cdot T_p$, wherein k is positive integer and $T_p$ is the C-DRX cycle. In one example, k can be provided to the UE by higher layer signaling, e.g. in a SIB or in the first configuration for the physical layer signal/channel. In another example, k can be defined in the system operation, for example, k=1.

In a second approach, $T_s$ can be a number of slots or millisecond that is provided to the UE by higher layer signaling. For example, $T_s$ is provided to the UE in the first configuration for the physical layer signal/channel.

The UE can determine a duration, $D_s$, for reception of the physical layer signal/channel with an adaptation indication on C-DRX, wherein the UE can receive the physical layer signal/channel in any slot within the duration per a monitoring periodicity, The duration $D_s$ can consists of a number of N>=1 reception occasions for the physical layer signal/channel, wherein each reception occasion is QCLed with a reference signal (RS). In one example, a RS can be a SSB from the burst of SSBs configured ssb-PositionsInBurst, e.g. in SIB1. In another example, a RS can be provided to the UE by higher layer signaling, e.g. in the first configuration for the physical layer signal/channel.

A value of the adaptation indication carried in the physical layer signal/channel is referred to as a code-point. The adaptation indication can indicate a code-point from a set of code-points.

In one approach for determining the adaptation aspect on C-DRX, a code-point can indicate start of ON duration. The UE can be provided with N>=1 candidate locations for start of ON duration. For example, the N>=1 candidate locations can be consecutive N durations. The start of the k-th (k=1, ..., N) candidate location, $n_{start,k}$, can be determined, such that $n_{start,k} = n_{start,1} + (k-1) \cdot D$, wherein $n_{start,1}$ is the start of the first candidate location, and D is the duration of a ON duration. $n_{start,1}$ or D can be provided to the UE by higher layer signaling.

In one example, a code-point can be a bitmap, where a UE is linked to one of bit from the bit map. A binary value of a bit from the bitmap indicates whether or not linked UE(s) need to wake up for ON duration in next one or more C-DRX cycles. When a UE is indicated to wake up for ON duration in next one or more C-DRX cycles, such that the bit linked to the UE has a value of "1", the UE determines start of ON duration is the nth candidate location from the N>=1 candidate locations, wherein the bit linked to the UE is the nth bit from the bitmap that indicates linked UE(s) to wake up for ON duration, i.e. the nth bit with value of "1".

In another example, a code-point can indicate an index, n=0 ..., N−1, of a candidate location from the N>=1 candidate locations.

FIG. 8 illustrates an example timeline 800 for the dynamic adaptation an C-DRX regarding the start of the ON duration according to embodiments of the present disclosure. The embodiment of the example timeline 800 for the dynamic adaptation an C-DRX regarding the start of the ON duration shown in FIG. 8 is for illustration only. Other embodiments of the example timeline 800 for the dynamic adaptation a C-DRX regarding the start of the ON duration could be used without departing from the scope of this disclosure.

As illustrated in FIG. 8, UEs receive a first physical layer signal/channel that carries a first adaptation indication on C-DRX regarding the start of an ON duration, 801. The first adaptation indication has a code-point of "1010", which indicates UEs linked with a first bit and a third bit to wake up for the ON duration in the next C-DRX cycle. UEs linked to the first bit wake up for the ON duration in the first candidate ON duration, 802, in the next C-DRX cycle, and UEs linked to the third bit wake up for the ON duration in the second candidate ON duration, 803, in the next C-DRX cycle. UEs receive a second physical layer signal/channel that carries a second adaptation indication on C-DRX regarding the start of the ON duration, 804. The second adaptation indication has a code-point of "0111", which indicates UEs linked with the second bit, third bit, and fourth bit to wake up for the ON duration in the next C-DRX cycle. UEs linked to the second bit wake up for the ON duration in the first candidate ON duration, 805, in the next C-DRX cycle, UEs linked to the third bit wake up for the ON duration in the second candidate ON duration, 806, in the next C-DRX cycle, and UEs linked to the fourth bit wake up for the ON duration in the third candidate ON duration, 807, in the next C-DRX cycle.

In one approach for determining the adaptation aspect on C-DRX, a code-point can indicate any of the following configuration information for C-DRX:

In one example, a code-point indicates a long C-DRX cycle. The UE can be provided with multiple candidate configurations for the long C-DRX cycle. A code-point indicates one of the multiple candidate configurations for the long C-DRX cycle.

In one example, a code-point indicates a short C-DRX cycle. The UE can be provided with multiple candidate configurations for the short C-DRX cycle. A code-point indicates one of the multiple candidate configurations for the short C-DRX cycle.

In one example, a code-point indicates ON duration for C-DRX. The UE can be provided with multiple candidate configurations for the ON duration for C-DRX.

A code-point indicates one of the multiple candidate configurations for the ON duration for C-DRX.

In one example, a code-point indicates inActivityTimer for C-DRX. The UE can be provided with multiple candidate configurations for the inActivityTimer for C-DRX. A code-point indicates one of the multiple candidate configurations for the inActivityTimer for C-DRX.

In one example, a code-point indicates a configuration from multiple candidate configurations for C-DRX. The UE can be provided with multiple candidate configurations for C-DRX, wherein each candidate configuration for C-DRX includes any configuration information from a) long C-DRX cycle, b) short C-DRX cycle, c) ON duration for C-DRX, and d) inActivity-Timer for C-DRX.

When the UE receives the physical/channel signal/channel with the adaptation indication on C-DRX, the UE applies the adaptation indication at a reference point. The UE can determine the reference point based on at least one of the following approaches:

In one approach, the reference point is the start of the next C-DRX cycle, wherein the next C-DRX cycle is the first C-DRX cycle that is after the last symbol of the physical layer signal/channel where the UE receives the adaptation indication. The start of the next C-DRX cycle can be the start of the first slot/SFN of the next C-DRX cycle.

In one approach, the reference point is the start of the next C-DRX cycle, wherein the next C-DRX cycle is the first C-DRX cycle after the current C-DRX cycle where the UE receives the adaptation indication. When the physical layer signal/channel where the UE receives the adaptation indication occupies time domain resources across two C-DRX cycles, the current C-DRX cycle can be the earlier C-DRX cycle of the two C-DRX cycles or the latter C-DRX cycle of the two C-DRX cycles. The start of the next C-DRX cycle can be the start of the first slot/SFN of the next C-DRX cycle.

After the UE applies the adaptation indication on C-DRX, the UE receives data via PDSCH or transmit data via PUSCH within the active time of C-DRX based on the adaptation indication. The UE can assume the validity period or effective period of adaptation indication based on one of the following approaches:

In one approach, the UE assumes the adaptation indication is valid till the UE receives another adaptation indication.

In one approach, the UE assumes the adaptation indication is valid for a time duration. The unit of the time duration can be a slot or a millisecond or a monitoring periodicity of paging PDCCH. In one example, the time duration can be provided to the UE by higher layers, e.g. via RRC signaling or in SIB. In another example, the time duration can be predetermined in the specification of the system operation. In yet another example, the time duration can be provided in the physical layer signal/channel carries the adaptation indication.

In one embodiment, a dynamic adaptation on configuration for reception of paging PDCCH, wherein a paging PDCCH includes a DCI format with CRC scrambled by paging RNTI (P-RNTI) which can schedule a PDSCH for a paging message is considered. . . .

FIG. 9 illustrates an example method 900 performed by a UE for the dynamic adaptation on the configuration for reception of a paging PDCCH according to embodiments of the present disclosure. The embodiment of the example method 900 performed by a UE for the dynamic adaptation on the configuration for reception of a paging PDCCH shown in FIG. 9 is for illustration only. Other embodiments of the example method 900 performed by a UE for the dynamic adaptation on the configuration for reception of a paging PDCCH could be used without departing from the scope of this disclosure.

As illustrated in FIG. 9, the method 900 begins at block 901, where a UE receives a first configuration for a broadcast/multicast physical layer signal/channel which carries an adaptation indication on configuration for reception of paging PDCCH. At block 902, the UE receives the physical layer signal/channel in a reception occasion according to the first configuration. At block 903, the UE determines a second configuration for reception of paging PDCCH based on the adaptation indication carried in the received physical layer signal/channel. At block 904, the UE monitors PDCCH for DCI format with CRC scrambled by P-RNTI according to the second configuration.

The UE can receive a first configuration for a physical layer signal/channel from a serving cell, wherein the physical layer signal/channel is configured with an adaptation indication on the configuration for reception of paging PDCCH. The UE can assume any of the following approaches for the design of the physical layer signal/channel:

In one approach, the physical layer signal/channel is a PDCCH broadcast to all connected UEs in the serving cell. The UE is configured to monitor or receive the cell-specific PDCCH in common search space. The PDCCH carries a DCI format with CRC bits scrambled by a RNTI which is common to all connected UEs in the serving cell, wherein the adaptation indication is a field in the DCI format. The UE can receive the first configuration in a SIB. In one example, the RNTI can be dedicated to cell-specific adaptation for NW energy savings. In another example, the RNTI can be provided to UE in a SIB. In yet another example, the RNTI can be determined based on cell ID. In one sub-example, the UE assumes the field in the DCI format consists of multiple blocks, wherein the UE is configured to receive the adaptation indication in one block of the multiple blocks. The UE can determine the block from the location of the one block in the payload of the DCI formation based on the first configuration.

In one approach, the physical layer signal/channel is a PDCCH multicast to a group of connected UEs in the serving cell. The UE is configured to monitor or receive the group common (GC) PDCCH in common search space. The PDCCH carries a DCI format with CRC bits scrambled by a RNTI which is common to the group of connected UEs in the serving cell, wherein the adaptation indication is a field in the DCI format. The UE can receive the second configuration in via RRC signaling. In one example, the RNTI can be dedicated to cell-specific adaptation for NW energy savings. In another example, the RNTI can be group RNTI (G-RNTI). In yet another example, the RNTI can be SFI-RNTI. In one sub-example, the UE assumes the field in the DCI format consists of multiple blocks, wherein the UE is configured to receive the adaptation indication in one block of the multiple blocks. The UE can determine the block from the location of the one block in the payload of the DCI formation based on the first configuration.

In one approach, the physical layer signal/channel is a DL signal that is constructed based on a sequence. The DL signal is broadcast to all connected UEs in the serving cell. In one example, the sequence in the DL signal carries the adaptation indication. In another example, the sequence in the DL signal carries the RNTI, which is common to the group of connected UEs in the serving cell. In one sub-example, the RNTI can be dedicated to cell-specific adaptation for NW energy savings. In another sub-example, the RNTI can be provided to UE in a SIB. In yet another sub-example, the RNTI can be determined based on cell ID. The UE can receive the first configuration in a SIB.

In one approach, the physical layer signal/channel is a DL signal that is constructed based on a sequence. The DL signal is multicast to a group of connected UEs in the serving cell. In one example, the sequence in the DL signal carries the adaptation indication. In another example, the sequence in the DL signal carries the RNTI, which is common to all connected UEs in the serving cell. In one sub-example, the RNTI can be dedicated to cell-specific adaptation for NW energy savings. In another sub-example, the RNTI can be group RNTI (G-RNTI). In yet another sub-example, the RNTI can be SFI-RNTI. The UE can receive the first configuration via RRC signaling.

The UE can determine a monitoring periodicity, $T_s$, for the physical layer signal/channel with an adaptation indication on the configuration for reception of paging PDCCH, based on one of the following approaches:

In one approach, $T_s$ is one or multiple monitoring periodicity for paging PDCCH reception, such that $T_s = k \cdot T_p$, wherein k is positive integer and $T_p$ is the PDCCH monitoring periodicity for a search space set configured for paging PDCCH reception or a DRX cycle configured for paging PDCCH reception. In one example, k can be provided to the UE by higher layer signaling, e.g. in a SIB or in the first configuration for the physical layer signal/channel. In another example, k can be defined in the system operation, for example, k=1.

In one approach, $T_s$ can be a number of slots or millisecond that is provided to the UE by higher layer signaling. For example, $T_s$ is provided to the UE in the first configuration for the physical layer signal/channel.

The UE can determine a duration, $D_s$, for reception of the physical layer signal/channel with an adaptation indication on the configuration for reception of paging PDCCH, wherein the UE can receive the physical layer signal/channel in any slot within the duration per a monitoring periodicity. The duration $D_s$ can include a number of N>=1 reception occasions for the physical layer signal/channel, wherein each reception occasion is QCLed with a reference signal (RS). In one example, an RS can be an SSB from the burst of SSBs configured by ssb-PositionsInBurst e.g., in SIB1. In another example, an RS can be provided to the UE by higher layer signaling, e.g., in the first configuration for the physical layer signal/channel.

A value of the adaptation indication carried in the physical layer signal/channel is referred as a code-point. The adaptation indication can indicate a code-point from a set of code-points, wherein a code-point can indicate any of the following configuration information for reception of the paging PDCCH:

In one approach, a code-point indicates a number of paging frames (PFs) per DRX cycle for paging PDCCH reception. The UE can be provided with multiple candidate configurations for the number of PFs per DRX cycle. A code-point indicates one of the multiple candidate configurations for the number of PFs per DRX cycle.

In one approach, a code-point indicates a number of paging occasions (POs) per PF. The UE can be provided with multiple candidate configurations for the number of POs per PF. A code-point indicates one of the multiple candidate configurations for the number of POs per PF.

In one approach, a code-point indicates a number of PDCCH reception occasion(s) per PO. The UE can be provided with multiple candidate configurations for the number of PDCCH reception occasion(s) per PO. A code-point indicates one of the multiple candidate configurations for the number of PDCCH reception occasion(s) per PO.

In one approach, a code-point indicates a number of sub-groups per PO. The UE can be provided with multiple candidate configurations for the number of sub-groups per PO. A code-point indicates one of the multiple candidate configurations for the number of sub-groups per PO.

In one approach, a code-point indicates DRX cycle for paging PDCCH reception. The UE can be provided with multiple candidate configurations for the DRX cycle for paging PDCCH reception. A code-point indicates one of the multiple candidate configurations for the DRX cycle for paging PDCCH reception.

In one approach, a code-point indicates PDCCH monitoring periodicity for the search space set configured for paging PDCCH reception. The UE can be provided with multiple candidate configurations for the PDCCH monitoring periodicity for the search space set configured for paging PDCCH reception. A code-point indicates one of the multiple candidate configurations for the PDCCH monitoring periodicity for the search space set configured for paging PDCCH reception.

In one approach, a code-point indicates a configuration from multiple candidate configurations for paging PDCCH reception. The UE can be provided with multiple candidate configurations for paging PDCCH reception, wherein each candidate configuration for paging PDCCH reception includes any configuration information from a) a number of PFs per DRX cycle for paging, b) a number of POs per PF, c) a number of PDCCH reception occasion(s) per PO, d) a number of sub-groups per PO, e) a DRX cycle for paging PDCCH reception, f) a PDCCH monitoring periodicity for the search space set configured for paging PDCCH reception.

When the UE receives the physical/channel signal/channel with the adaptation indication on configuration for paging PDCCH reception, the UE applies the adaptation indication at a reference point. The UE can determine the reference point based on at least one of the following approaches:

In a first approach, the reference point is start of next DRX cycle for paging PDCCH reception, wherein the next DRX cycle is the first DRX cycle that is after the last symbol of the physical layer signal/channel where the UE receives the adaptation indication. The start of next DRX cycle can be the start of the first slot/SFN of the next DRX cycle for paging PDCCH reception.

In a second approach, the reference point is start of next DRX cycle for paging PDCCH reception, wherein the next DRX cycle is the first DRX cycle after the current DRX cycle where the UE receives the adaptation indication. When the physical layer signal/channel where the UE receives the adaptation indication occupies time domain resources across two DRX cycles, the current DRX cycle can be the earlier DRX cycle of the two DRX cycles or the latter DRX cycle of the two DRX cycles. The start of next DRX cycle can be the start of the first slot/SFN of the next DRX cycle for paging PDCCH reception.

After the UE applies the adaptation indication on configuration for paging PDCCH reception, the UE monitors paging PDCCH according to the new configuration for reception of paging PDCCH based on the adaptation indication. The UE can assume the validity period or effective period of the new configuration based on one of the following approaches:

In one approach, the UE assumes the new configuration is valid till the UE receives another adaptation indication.

In one approach, the UE assumes the new configuration is valid for a time duration. The unit of the time duration can be a slot or a millisecond or a monitoring periodicity of paging PDCCH. In one example, the time duration can be provided to the UE by higher layers, e.g. via RRC signaling or in SIB. In another example, the time duration can be predetermined in the specification of the system operation. In yet another example, the time duration can be provided in the physical layer signal/channel carries the adaptation indication.

FIG. 10 illustrates an example timeline 1000 for the dynamic adaptation on the configuration for reception of a paging PDCCH according to embodiments of the present disclosure. The embodiment of the example timeline 1000 for the dynamic adaptation on the configuration for reception of a paging PDCCH shown in FIG. 10 is for illustration only. Other embodiments of the example timeline 1000 for the dynamic adaptation on the configuration for reception of a paging PDCCH could be used without departing from the scope of this disclosure.

As illustrated in FIG. 10, a UE receives a physical layer signal/channel that carries an adaptation indication on configuration for reception of a paging PDCCH, 1002. 1001 indicates the location of a PF for the current DRX cycle when the UE receives the physical layer signal/channel. The adaptation indication indicates to adapt a number of PFs per DRX for paging to 2. So, the UE starts to assume the number of PFs per DRX is 2 in the next DRX cycle for paging. 1003 indicates the location of a PF for the next DRX cycle for paging.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system,
the BS comprising:
a transceiver configured to transmit a set of configurations by a higher layer, wherein a first configuration from the set of configurations indicates a first periodicity for transmission of downlink signals and a second configuration from the set of configurations for a physical downlink control channel (PDCCH) includes a downlink control information (DCI) format, wherein the DCI format includes adaptation information,
transmit the downlink signals based on the first configuration, and
transmit the PDCCH including the DCI format based on the second configuration; and
a processor operably coupled to the transceiver and configured to identify, based on the adaptation information, a third configuration indicating a second periodicity for transmission of the downlink signals,
wherein the transceiver is further configured to transmit the downlink signals based on the third configuration,
wherein:
the second periodicity is applied at a beginning of a slot,
the slot occurs after an application time delay from a time of reception of the PDCCH, and
the application time delay is pre-determined.

2. The BS of claim 1, wherein the downlink signals include a synchronization signal and physical broadcast channel (SS/PBCH) block.

3. The BS of claim 1, wherein:
the set of configurations is user equipment (UE)-specific radio resource control (RRC) parameters, and
the UE is in a CONNECTED mode.

4. The BS of claim 1, wherein:
the second configuration includes parameters for a common search space (CSS) set,
the PDCCH is monitored based on the CSS set, and
the PDCCH is UE-group-common.

5. The BS of claim 1, wherein:
the DCI format is associated with cyclic redundancy check (CRC) bits scrambled by a radio network temporary identifier (RNTI) dedicated for adapting between the first periodicity and the second periodicity,
the second configuration further includes an indication on a location of a block within a set of blocks,
the set of blocks are included in the DCI format, and
the block includes the adaptation information.

6. The BS of claim 1, wherein:
the second configuration further includes an indication on a location of a block within a set of blocks,
the set of blocks are included in the DCI format, and
the block includes the adaptation information.

7. A user equipment (UE) in a wireless communication system, the UE comprising:
a transceiver configured to receive a set of configurations from a higher layer; and a processor operably coupled to the transceiver, the processor configured to:

identify a first configuration from the set of configurations indicating a first periodicity for reception of downlink signals, and identify a second configuration from the set of configurations for a physical downlink control channel (PDCCH) including a downlink control information (DCI) format, wherein:

the DCI format includes adaptation information, the transceiver is further configured to:

receive the downlink signals based on the first configuration, and receive the PDCCH including the DCI format based on the second configuration, the processor is further configured to, based on the adaptation information, identify a third configuration indicating a second periodicity for reception of the downlink signals, the transceiver is further configured to receive the downlink signals based on the third configuration, the second periodicity is applied at a beginning of a slot, the slot occurs after an application time delay from a time of reception of the PDCCH, and the application time delay is pre-determined.

8. The UE of claim 7, wherein the downlink signals include a synchronization signal and physical broadcast channel (SS/PBCH) block.

9. The UE of claim 7, wherein:

the set of configurations is UE-specific radio resource control (RRC) parameters, and the UE is in a CONNECTED mode.

10. The UE of claim 7, wherein:

the second configuration includes parameters for a common search space (CSS) set, the PDCCH is monitored based on the CSS set, and the PDCCH is UE-group-common.

11. The UE of claim 7, wherein the DCI format is associated with cyclic redundancy check (CRC) bits scrambled by a radio network temporary identifier (RNTI) dedicated for adapting between the first periodicity and the second periodicity.

12. The UE of claim 7, wherein:

the second configuration further includes an indication on a location of a block within a set of blocks, the set of blocks are included in the DCI format, and the block includes the adaptation information.

13. A method of a user equipment (UE) in a wireless communication system, the method comprising:

receiving a set of configurations from a higher layer;

identifying a first configuration from the set of configurations indicating a first periodicity for reception of downlink signals;

identifying a second configuration from the set of configurations for a physical downlink control channel (PDCCH) including a downlink control information (DCI) format, wherein the DCI format includes adaptation information;

receiving the downlink signals based on the first configuration;

receiving the PDCCH including the DCI format based on the second configuration;

identifying, based on the adaptation information, a third configuration indicating a second periodicity for reception of the downlink signals; and receiving the downlink signals based on the third configuration, wherein:

the second periodicity is applied at a beginning of a slot, the slot occurs after an application time delay from a time of reception of the PDCCH, and the application time delay is pre-determined.

14. The method of claim 13, wherein the downlink signals include a synchronization signal and physical broadcast channel (SS/PBCH) block.

15. The method of claim 13, wherein:

the set of configurations is UE-specific radio resource control (RRC) parameters, and the UE is in a CONNECTED mode.

16. The method of claim 13, wherein:

the second configuration includes parameters for a common search space (CSS) set, the PDCCH is monitored based on the CSS set, and the PDCCH is UE-group-common.

17. The method of claim 13, wherein the DCI format is associated with cyclic redundancy check (CRC) bits scrambled by a radio network temporary identifier (RNTI) dedicated for adapting between the first periodicity and the second periodicity.

18. The method of claim 13, wherein:

the second configuration further includes an indication on a location of a block within a set of blocks, the set of blocks are included in the DCI format, and the block includes the adaptation information.

\* \* \* \* \*